United States Patent
Bross

Patent Number: 5,898,698
Date of Patent: Apr. 27, 1999

[54] MULTIPLE CODEWORD INTERLEAVER METHOD AND APPARATUS

[75] Inventor: Shraga Bross, Kfar-Sava, Israel

[73] Assignee: Orckit Communications Ltd., Tel-Aviv, Israel

[21] Appl. No.: 08/935,621

[22] Filed: Sep. 23, 1997

Related U.S. Application Data

[60] Provisional application No. 60/027,014, Sep. 24, 1996.

[51] Int. Cl.$^6$ .................................................. G06F 11/00
[52] U.S. Cl. ............................................................. 371/2.1
[58] Field of Search ............................................. 371/2.1

[56] References Cited

U.S. PATENT DOCUMENTS 5,675,586  10/1997  Sato et al. ................................. 371/2.1

OTHER PUBLICATIONS

John L. Ramsey, "Realization of Optimum Interleavers", IEEE Transactions on Information Theory, vol. IT–16, No. 3, pp. 338–345 (May 1970).

Miguel Peeters et al., "A Dynamic Interleaving Scheme for VDSL", Standards Project T1E1.4: VDSL, T1E1.4/97–052, pp. 1–8 (Feb. 3–7, 1997).

Shou Y. Mui, "Pseudo–Random Convolutional Interleaving", U.S. Patent Applic. Serial No. 556, 661, Department of the Army (Filed Nov. 30, 1983).

P.T. Tong et al., "Revised FEC and Interleaving Recommendations for DMT ADSL", Standards Project T1E1.4: ADSL, T1E1.4/93–117, pp. 1–6 (May 10, 1993).

*Primary Examiner*—Phung M. Chung
*Attorney, Agent, or Firm*—Darby & Darby

[57] ABSTRACT

An interleaver which allows the use of consecutive groups of codewords within a frame, where the maximum size of each codeword is constrained to be equal to or less than a certain maximum size. In accordance with required performance standards, i.e., the specification of a maximum number of data errors that the system is supposed to withstand, the interleaver is capable of limiting the number of errors which occur within a specific codeword to be less than the maximum number of errors that can be corrected by the particular coding scheme. The interleaver is able to achieve this result even for codewords of uneven length. The interleaver attempts to divide the total number of symbols to be transmitted in a frame into equal size codewords. If the codeword size cannot be made equal, then unequal size codewords are used, however, the difference in size between codewords cannot be greater than one symbol. The R dimension of the interleaver memory is then generally determined based on the largest codeword size, except with certain modifications. Based on whether the codeword lengths are even, odd or a mix of even odd, a variable number of "dummy" symbols is inserted into the codewords to maintain the R and C dimensions of the interleaver memory such that R and C do not have any common multiple factors. A de-interleaver may also be realized by essentially performing the reverse process as the interleaver.

14 Claims, 4 Drawing Sheets

Fig. 1

(PRIOR ART)

| | 1 | 2 | • | • | • | • | • | 10 |
|---|---|---|---|---|---|---|---|---|
| | D | D | | | | | | |
| | D | B1 | | | | | | |
| | A1 | B2 | | | | | | |
| | | | | | | | | |
| | A48 | B49 | | | | | | |
| | A49 | B50 | | | | | | |

|   1   |   2   |   •   •   •   •   •   |  10   |
|-------|-------|-----------------------|-------|
|  A1   |  B1   |                       |       |
|  A2   |  B2   |                       |       |
|       |       |                       |       |
|  A49  |  B49  |                       |       |
|   D   |  B50  |                       |       |
|   D   |   D   |                       |       |

MULTIPLE CODEWORD INTERLEAVER METHOD AND APPARATUS

The enclosed application is based on Provisional Patent Application Ser. No. 60/027,014, filed on Sep. 24, 1996. Applicant claims the benefit of the filing date of the aforesaid Provisional Application under 35 U.S.C. §119(e)(1).

FIELD OF THE INVENTION

The present invention generally relates to the field of data communications and processing. Specifically, the present invention relates to a method and apparatus for a multiple codeword interleaver for reducing the effects of transmission errors in a data communications system.

BACKGROUND OF THE INVENTION

Digital data communications systems are commonly used to transmit and/or receive data between remote transmitting and receiving locations. A central facet of any data communications system is the reliability and integrity of the data which is being communicated. Ideally, the data which is being transmitted from the transmitting location should be identical to the data which is being received at the receiving location. Practically however, the data which is received at the receiving location has oftentimes been corrupted with respect to the original data that was transmitted from the transmitting location. Such data communication errors may be attributed in part to one or more of the transmission equipment, the transmission medium or the receiving equipment. With respect to the transmission medium, these types of data errors are usually attributed to the less than ideal conditions associated with the particular transmission medium.

To overcome these problems, data communications systems often rely on error detection and error correction schemes, to detect the occurrence of a data error and to correct a data error, respectively. One simple form of error detection is the use of a parity bit associated with each block of data to indicate whether the particular block contains an odd or even number of 1 bits. However, this is a very simple scheme which has numerous disadvantages. It is a simple type of error detection scheme which is capable of accurately detecting up to one bit error per data block. Moreover, the use of a parity bit cannot detect the occurrence of two bit errors in a data block, since this is not even detected as a parity violation. Additionally, the use of a parity bit only detects errors; it cannot correct errors. Any time that an error is detected, the receiving location typically requests retransmission of the particular data block from the transmitting location.

One type of error correction scheme commonly used in data communications systems is the use of redundant data transmissions and a voting circuit at the receiving location. In such a system, the data being transmitted is repeated a number of times, such as five. At the receiving location, all five data blocks are received and processed by a voting circuit which compares the five received versions of each data bit and determines the bit to be a 1 or 0 based on the voting consensus. Although such a system is capable of detecting and correcting data errors, it does so at a great cost in terms of the effective data throughput or transmission rate. This is due to the fact that each data block must be repeated a number of times.

The above-mentioned correction/detection schemes are examples of binary block codes. Specifically, an (n,k,d) binary block code is a set of $2^k$ binary codewords of block length n and minimum distance d (i.e., coding distance). The transmitted data is partitioned into binary blocks of length k, then each block is mapped into a binary codeword of length n, which is then modulated and transmitted through the channel. This block code is capable of correcting up to $t=(d-1)/2$ errors within each codeword. As mentioned above, there are cases where channel errors occur in non-frequent bursts, the length of which exceeds the error correction capability of the code. These cases are handled by interleaving the data stream before it is modulated and transmitted through the channel. Functionally, an interleaver is a memory device which is used to rearrange and separate the codewords or frames which are to be transmitted. The terms codeword and frame are used interchangeably herein where a frame includes only one codeword. Instead of transmitting a succession of complete codewords, the interleaver allows the transmission of a portion (such as a byte) of a first codeword, followed by a portion of a second codeword, and so on. Henceforth, these portions will be referred to as either symbols or codeword symbols. In this way, if an error burst occurs during transmission, the error burst will not be localized to one particular frame. Rather, the errors will be spread across several codewords. If the errors were completely within one codeword, they may exceed the number of errors which the system can inherently correct for by the use of a block code. By spreading the data errors across several blocks, the number of errors within each block may be reduced to the point where the system is capable of correcting the data errors.

In a simple interleaver, data is written into the memory in columns and then read out in rows for subsequent transmission. At the receiver end, the received data is written into a de-interleaver in rows and then read out in columns. The interleaver rearranges the data within the codewords, and the de-interleaver essentially performs the reverse process to reconstruct the codewords for subsequent use. In this type of interleaver, all the data write operations are carried out as a group, and then the data read operations are carried out as a group. This type of interleaving, referred to as block interleaving, introduces latency of one block at the transmitter and one block at the receiver, due to the fact that a complete block has to be written before it can be read.

Figure 1:
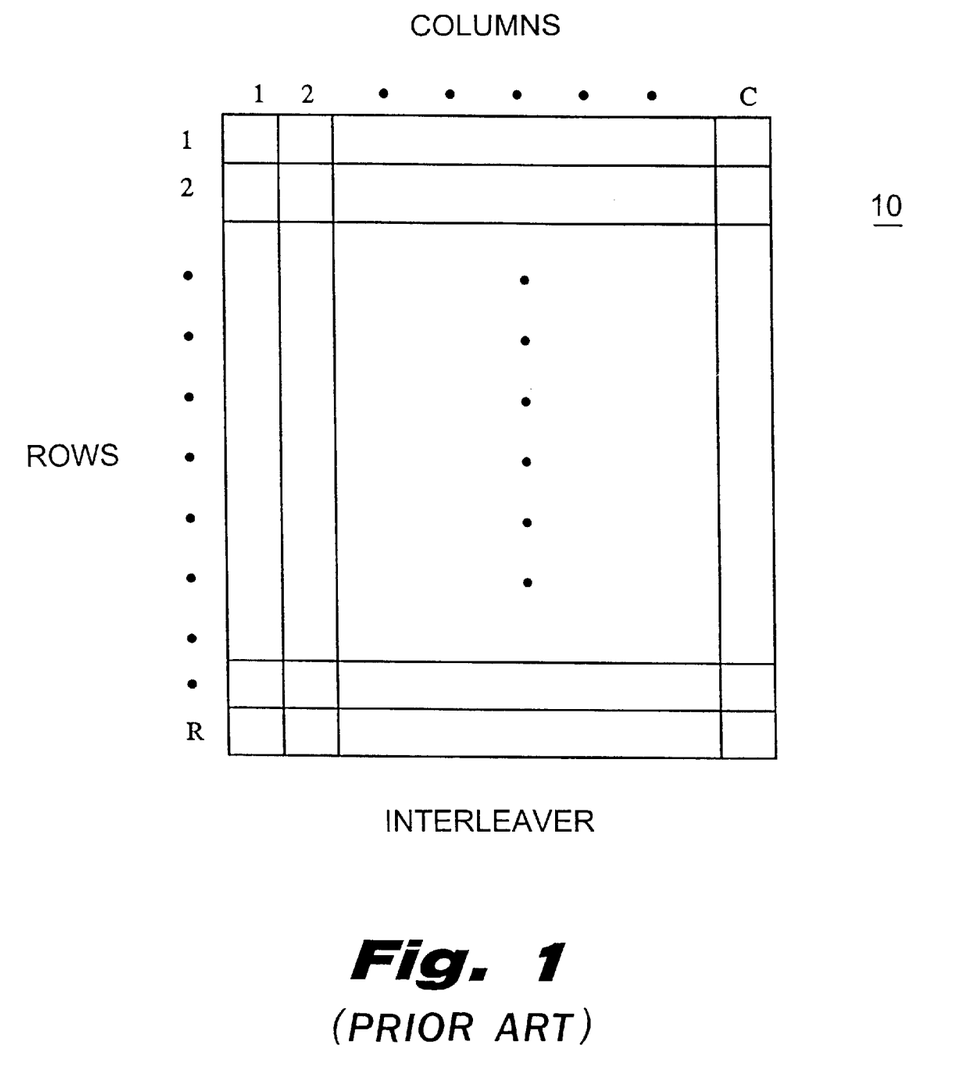
FIG. 1 is an illustration of a prior art interleaver memory.

Another type of interleaver, referred to as a convolutional interleaver, has been introduced (J. S. Ramsey, "Realization of Optimum Interleavers", IEEE Trans. on Information Theory, Vol. IT-16, No. 3, pp. 338–345, May, 1970, the contents of which are incorporated herein by reference) as a means of reducing the latency incurred in block interleaving by one-half. In the convolutional interleaver, the individual read and write operations are alternated instead of being carried out all at once as a group of write operations followed by a group of read operations. Additionally, in the convolutional interleaver, the read operation following a write operation begins at the next memory location following where the write operation left off. This aspect of convolutional interleavers will be described in more detail with reference to FIG. 1 which shows the memory structure of a convolutional interleaver. As shown in FIG. 1, a convolutional interleaver memory 10 is configured to have R rows, numbered 1 through R, and C columns, numbered 1 through C. A codeword of frame which enters the interleaver is spread and reordered at the interleaver output. The size of R is often chosen to correspond to the number of symbols in a codeword or frame which is to be transmitted, while the size of C determines the interleaving depth which is the number of codeword frames over which a transmitted codeword at the interleaver input is spread by the interleaving process at the interleaver output. The memory locations of interleaver memory 10 are labelled for reference purposes as: (1,1) for the upper left memory location; (R,1) for the lower left memory location; (1,C) for the upper right memory location; and (R,C) for the lower right memory location. The selection of the specific dimensions R and C for any particular application is constrained such that R and C cannot have a common multiple factor (except for 1, of course). In a given application where R and C do have a common multiple factor, P. T. Tong, T. N. Zogakis and J. M. Cioffi, "Revised FEC and Interleaving Recommendations for DMT ADSL", ANSI T1E1.4/93-117, May 10, 1993, the contents of which are incorporated herein by reference, propose the addition of a "dummy" symbol, that is not actually transmitted, to the beginning of each codeword frame at the interleaver input. This artificially increases the R dimension, such that R and C do not have any common multiple factors. These "dummy" symbols are used primarily to maintain proper memory pointers and addresses, as discussed in detail below, and are extracted prior to data transmission so as not to consume a portion of the usable bandwidth of the system. Similar "dummy" symbols are used in the de-interleaver.

For example, in the case where R=151, C=10 and the codewords are thus 151 symbols long, the first operation performed by the interleaver is to write the first codeword into the interleaver memory 10 starting at location (1,1) and continuing to location (151,1). Next, a read operation is performed starting at the next memory location following the last symbol of the previously written codeword. In general, "wrap around" techniques are used to determine the next memory location for subsequent operations, as well as when the end of a column is reached. The wrap around may be either within the same column, or to the next column. Thus, in the case of wrap around within the same column, after the first write operation described above, the first read operation is performed beginning at location (1,1). If wrap around to the next column were used, the read operation would start at location (2,1). The description given herein will be in terms of wrap around within the same column; the principles of operation are equally applicable to wrap around to the next column. Alternatively, these write/read operations may be performed on a sub-codeword basis, such as a symbol, i.e., after each symbol is written, a symbol is read.

Beginning at location (1,1), the read operation is performed in rows. Since there are 10 symbols per row and the read operation will read 151 symbols, this corresponds to the first 15 full rows and the first symbol in row 16, i.e., locations (1,1) through (16,1). Because at this stage only the first column has valid data written into it, most of the data read out from the interleaver memory will be "garbage". Next, a write operation is performed beginning at the next location following the last read operation. Since the last read operation was at location (16,1), the write operation begins at location (16,2) and continues until the end of column 2 is reached (i.e., location (151,2)). At this point, a wrap around is performed to the top of the same column, i.e., location (1,2) and the write operation continues until location (15,2). Thus, the second block of data is written into the second column of the interleaver memory 10; however, the starting point is not the top of the column, but rather the 16th symbol of the column.

Next, a read operation is performed starting at the next location after the last write operation. Since the last write operation was at location (15,2), the read operation begins at location (16,2) and continues reading in rows, through location (31,2). This is followed by a write operation beginning at location (31,3) and continuing through location (30,3). The process is repeated until the interleaver memory 10 has been filled with valid data. It is thus apparent that the convolutional interleaver staggers the starting symbol for each column of data in the interleaver memory.

Data errors which occur during transmission typically affect a contiguous group of data symbols being transmitted. This can be viewed conceptually as the corruption of one or more consecutive rows of data in the interleaver memory. It will be recalled that data is read out from the interleaver memory in rows for subsequent transmission. The deleterious effects of data transmission errors are reduced in the first place by the operation of the interleaver. Instead of transmitting a succession of complete codewords, the interleaver transmits a series of symbols, one from each codeword. In this way, the effects of an error burst which lasts for a certain period of time, will be spread across several codewords. Thus, for example, if 20 consecutive symbol errors occur, they will not all be concentrated in one codeword, and instead may be manifested as one errored symbol in each of 20 codewords. By spreading the errors out over many codewords, the number of errored symbols in any given block will hopefully be reduced to a level that can be corrected by the inherent error correction capabilities of the particular coding scheme being used. In the above example, if a coding scheme which can correct up to four errored symbols per codeword is used, such a coding scheme will be overwhelmed if an interleaver is not used and 20 symbol errors occur in the same block. If instead, an interleaver is used, then the number of errors in each codeword may be reduced to four or less, within the error correction capabilities of the code.

Oftentimes it is desirable to group several "codewords" of data into a single frame. This is typically the case in certain transmission schemes where the frame rate is fixed, but it is desired to increase the overall number of codeword symbols being transmitted per frame. Typically, the size of the codewords cannot be increased beyond a certain maximum size. Thus, one approach that has evolved is to combine several codewords into a single frame. However, the combination of several codewords into a single frame presents certain problems when used with an interleaver. The straightforward approach to combining codewords in an interleaver is to simply write the complete codewords, one after the other, into the columns of the interleaver memory. However, in the case where smaller codewords are used, their error correcting capability is correspondingly reduced. Thus, since each codeword occupies a contiguous section of a column, if the rows affected by the data errors all occur within that section of the column, again, the error correcting capability of the code will be overwhelmed.

One solution to the above problem is to interleave the individual codewords in a frame before the frame data is input to the main interleaver described above. Essentially, this is a two level interleaving process. Thus, for example, if there are two codewords per frame, then the interleaver memory for each column would be filled with alternate symbols from the two codewords; if there are three codewords per frame, then the interleaver memory will be filled with a symbol from each of the three codewords in turn, so that the individual codewords will be spread out over every third symbol in the column. In this way, a burst of data errors occurring in a series of contiguous rows will be evenly spread over the alternated codewords within a column. However, this approach is disadvantageous in that a larger memory is needed to store the parallel codewords. Additional processing is also required to perform the alternating process.

SUMMARY OF THE INVENTION

The present invention is for an interleaver which allows the use of consecutive groups of codewords within a frame, where the maximum size of each codeword is constrained to be equal to or less than a certain maximum size. In accordance with required performance standards, i.e., the specification of a maximum burst length that the system is supposed to withstand, the interleaver of the present invention is capable of limiting the number of errors which occur within a specific codeword to be less than the maximum number of errors that can be corrected by the particular coding scheme. The interleaver of the present invention is able to achieve this result even for codewords of uneven length.

In general, the interleaver of the present invention attempts to divide the total number of symbols to be transmitted in a frame into equal size codewords. If the codeword size cannot be made equal, then unequal size codewords are used, however, the difference in size between codewords cannot be greater than one symbol. The R dimension of the interleaver memory is then generally determined based on the largest codeword size, except with certain modifications, as will be discussed in detail below. Based on whether the codeword lengths are even, odd or a mix of even odd, a variable number of "dummy" symbols is inserted into the codewords to maintain the R and C dimensions of the interleaver memory such that R and C do not have any common multiple factors.

The present invention will become more apparent from the following Brief Description of the Drawings and Description of Preferred Embodiments.

DESCRIPTION OF PREFERRED EMBODIMENTS

The determination of the depth (C) of the interleaver memory is based on several factors, including: (1) the overall delay of the system; (2) the size of the memory; and (3) the maximum amount of noise, or data errors, that the system must withstand. The deeper the interleaver memory, the greater the overall system delay in transmitting codewords and then reconstructing codewords at the de-interleaver. In essence, the codeword sections are scattered over a longer period of time. In the present invention, the depth of the interleaver is based on the maximum amount of data errors the system must withstand, divided by the number of errors that can be corrected by the coding scheme for the codewords. This insures that the coding scheme is not overwhelmed by a number of errors it cannot handle. In certain data transmission systems and standards, the depth of the interleaver is constrained to be a power of 2, i.e., 2, 4, 8, 16 . . . deep. In the following example, the depth "C" of the interleaver is constrained to be a power of 2. However, the principles of the present invention are also applicable to interleavers having a depth "C" not constrained to be a power of 2.

In the present invention, the codewords that make up a frame are made to be either equal in size, or within one symbol of each other. Several different cases result based on the size of the codewords. The four possible cases are: (1) all equal codewords of odd length; (2) all equal codewords of even length; (3) mixed odd and even codewords, where the odd codewords are larger than the even codewords; and (4) mixed odd and even codewords, where the even codewords are larger than the odd codewords.

If the codewords are all of odd size (and equal), then no dummy symbols are added to the beginning (or appended to the end) of the codewords.

If the codewords are all of even size (and equal), then one dummy symbol is added to the beginning (or appended to the end) of the codewords.

If the codewords are of mixed odd and even size, and the odd codewords are larger than the even codewords, then one dummy symbol is added to the beginning (or appended to the end) of the even sized codewords.

If the codewords are of mixed odd and even size, and the even codewords are larger than the odd codewords, then one dummy symbol is added to the beginning (or appended to the end) of the even codewords, and two dummy symbols are added to the beginning (or appended to the end) of the odd codewords.

Figure 2:
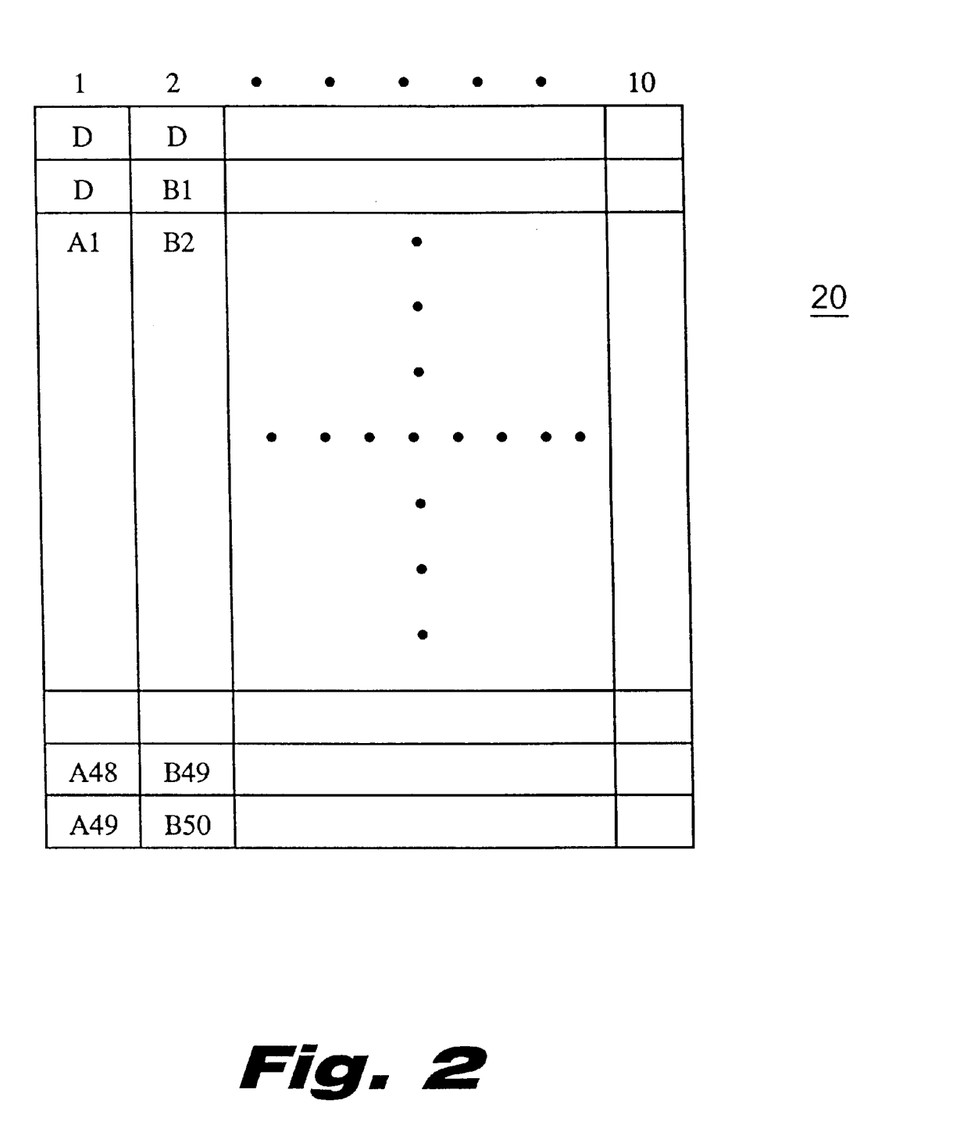
FIG. 2 is an illustration of an interleaver memory according to the present invention.
Figure 3:
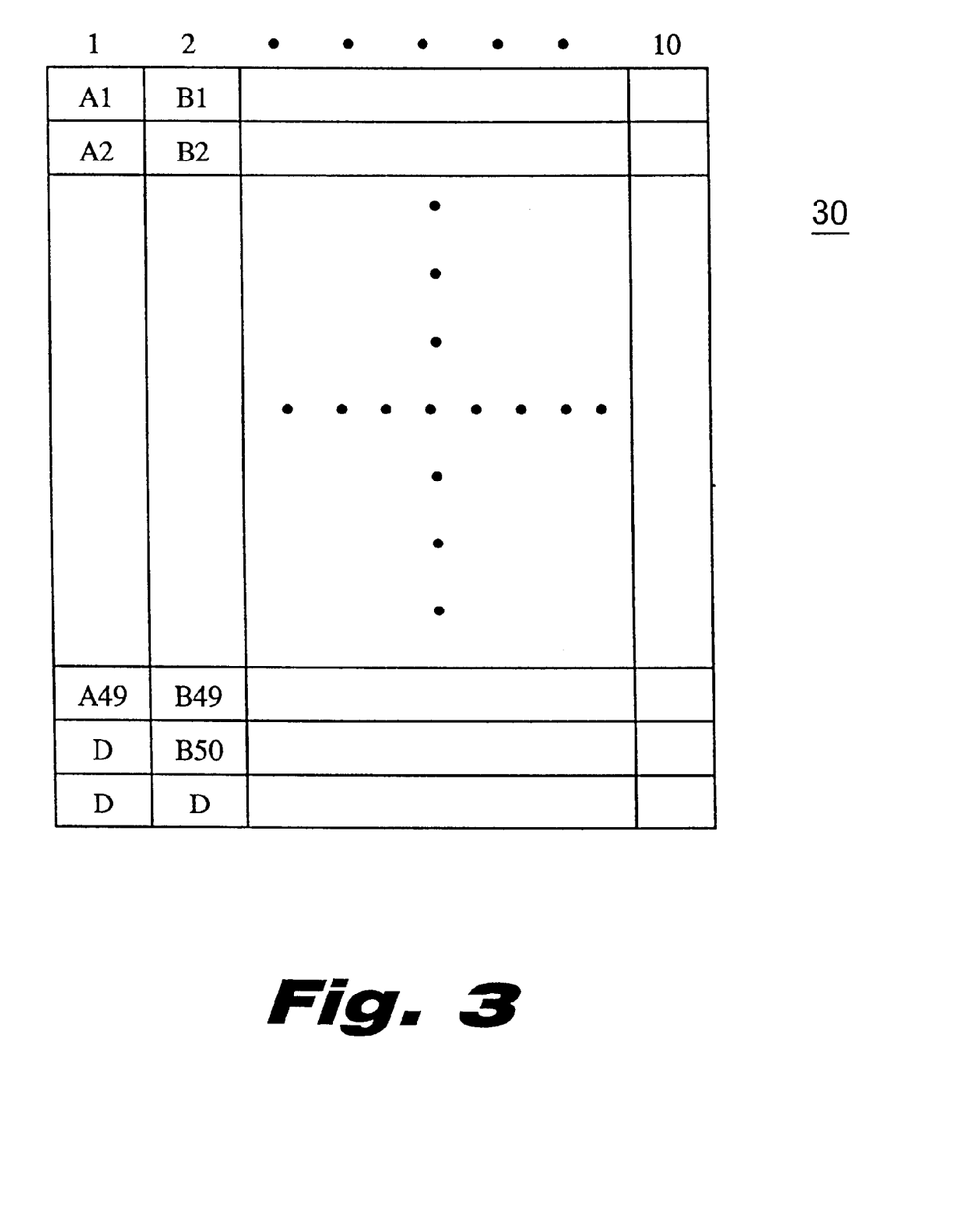
FIG. 3 is an illustration of an interleaver memory according to an alternative embodiment of the present invention.

Referring now to FIG. 2, therein is shown an interleaver memory 20 according to the present invention. In the particular example shown in FIG. 2, the frame length is set to 99 symbols, and includes two codewords, "A" and "B". According to the present invention, the 99 symbol frame is divided into an "A" codeword having 49 symbols and a "B" codeword having 50 symbols. This example corresponds to category (4) set forth above. As shown in FIG. 2, two dummy symbols "D" are added to the beginning of the odd codeword "A" making its artificial length equal to 51, and one dummy symbol is added to the beginning of the even codeword "B" also making its artificial length equal to 51. FIG. 3 illustrates the same case, except that the dummy symbols are appended to the end of the codewords.

Alternatively, where the depth C of the interleaver is not constrained to be a power of 2, the depth of the interleaver is compared against the length of the codewords to determine if there are any common multiple factors. If there are none, then the R and C dimensions of the interleaver memory have been determined. If R and C do have common multiple factors, then C is increased until any common multiple factors are eliminated. In general, when C is not constrained to be a factor of two, the process of determining the length of the codewords, and the optional addition of dummy symbols, is as follows. First, if the codewords are of equal length R and (R,C)=1, then the codewords are interleaved into the memory. The notation (R,C)=1 indicates that the only common multiple factor of R and C is 1. Conversely, the notation (R,C)≠1 indicates that R and C have common multiple factors in addition to 1. Next, if the codewords are of equal length R, (R,C)≠1 and (R+1,C)=1, an additional dummy symbol is added to the beginning (or appended to the end) of each codeword, and these codewords are interleaved into the memory. If the codewords are of different size, i.e., R and R+1, respectively, and (R+1, C)=1, an additional dummy symbol is added to the beginning (or appended to the end) of each codeword of length R, and the R+1 codewords and the modified codewords are interleaved into the memory. Finally, if the codewords are of different size, i.e., R and R+1, respectively, (R+1,C)≠1, and (R+2,C)=1, an additional dummy symbol is added to the beginning (or appended to the end) of each codeword of length R+1 and an additional two dummy symbols are added to the beginning (or appended to the end) of each codeword of length R, and these modified codewords are interleaved into the memory. The depth of the interleaver memory is chosen such that the length of the codewords, including any appended dummy symbols, and the depth of the memory do not have any common multiple factors.

The above detailed description of an interleaver according to the present invention is similarly applicable to a de-interleaver. However, it will be recognized by a person of ordinary skill in the art that the de-interleaver essentially performs the reverse process of that performed by the interleaver.

The de-interleaver performs the opposite process of the interleaver, i.e., its write mechanism writes rowwise while its read mechanism reads columnwise. Furthermore, in the de-interleaver, the read process precedes the write process. This means that the read process begins reading the first symbol from location (1,1) and then the write process writes the first symbol into location (1,1). After the first read-then-write operation is performed, the second read operation begins at location (2,1) while the second write operation begins at location (1,2) and so on.

For example, in the case where R=151 and C=10, the read process goes down the column up to (151,1) while the write process goes through the first 15 rows and performs the last write into (16,1). Then the read process begins at (16,2) and continues until the end of column 2 is reached, then it wraps around to location (1,2) and down up to location (15,2). The first write operation of the second frame begins at location (16,2) and ends at (31,2).

When a dummy symbol is added to the beginning of a frame at the interleaver side, the de-interleaver write process inserts a corresponding dummy symbol into the de-interleaver matrix on the first symbol of a frame. Obviously, the de-interleaver read process ignores this dummy symbol and does not read it into the de-interleaved output symbol sequence. The insertion of the dummy symbol into the de-interleave matrix just makes the addressing process work properly.

When two dummy symbols are added to the beginning of a frame at the interleaver side, the de-interleaver write process inserts a corresponding dummy symbol into the de-interleaver matrix on the first symbol of a frame and another dummy symbol on the C+1 symbol of the corresponding frame. Obviously, the de-interleaver read process ignores these dummy symbols and does not read them into the de-interleaved output symbol sequence. Again, the insertion of the dummy symbols into the de-interleave matrix just makes the addressing process work properly.

For example, when R=151, C=10 and one dummy symbol is added to the beginning of each frame at the interleaver side, then the de-interleaver write process writes dummy symbols into location (1,1) then into (16,2) and so on. If two dummy symbols are added to the beginning of each frame at the interleaver then the de-interleaver process writes dummy symbols into locations (1,1), (2,1) then into (16,2), (17,2) and so on.

The illustrative embodiment described above is an implementation of a convolutional interleaver in which the requirement for the addressing to work properly is (R,C)=1; however, it is equally applicable to any other interleaver implementation in which the requirement on (R,C) is the same as for the convolutional interleaver.

Figure 4:
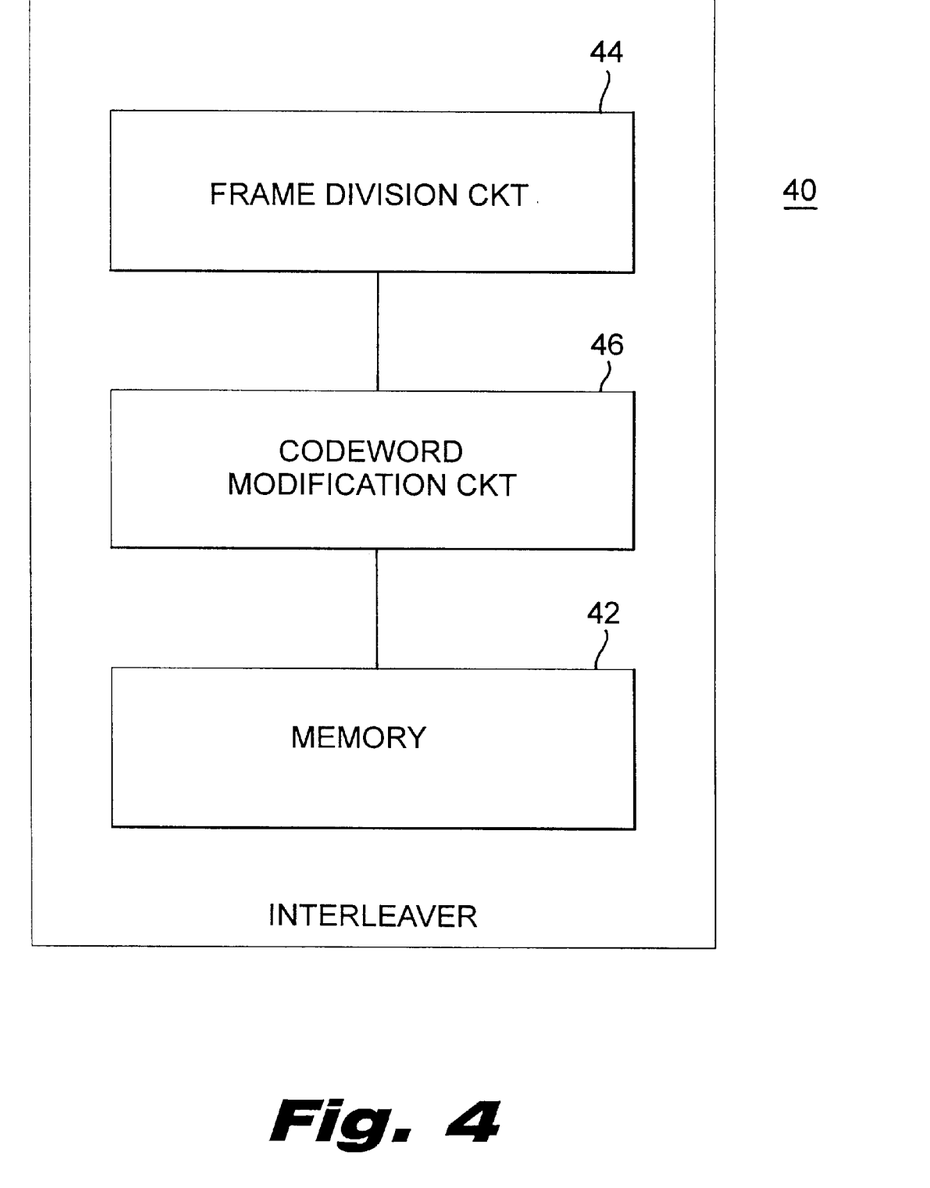
FIG. 4 is a block diagram of an interleaver according to the present invention.

FIG. 4 is a block diagram of an interleaver according to the present invention. The interleaver 40 includes a memory circuit 42, as well as a frame division circuit 44 which divides the frame into a number of codewords. Preferably, the length of the codewords is either equal or within one symbol of each other. The codewords are then optionally modified by a codeword modification circuit 46 which performs the codeword modifications discussed above.

While the invention has been particularly shown and described with reference to a preferred embodiment thereof, it will be understood by those skilled in the art that various changes in form and details may be made therein without departing from the spirit and scope of the invention.

What is claimed is:

1. A method of arranging a frame of data comprising a plurality of codewords into an interleaver memory having a length R and a depth C, the method comprising the following steps:

dividing said frame into a plurality of codewords, wherein the length of said codewords is either equal or within one symbol of each other;

optionally modifying said codewords according to the following rules:
if the codewords are of equal length R and (R,C)=1, then the codewords are interleaved into said memory;
if the codewords are of equal length R, (R,C)≠1 and (R+1,C)=1, each said codeword is modified to include an additional dummy symbol, and the modified codewords are interleaved into said memory;
if the codewords are of different size R and R+1, and (R+1,C)=1, each said codeword of length R is modified to include an additional dummy symbol, and the R+1 length codewords and the modified R length codewords are interleaved into said memory;
if the codewords are of different size R and R+1, (R+1,C)≠1, and (R+2,C)=1, each said codeword of length R+1 is modified to include an additional dummy symbol, each said codeword of length R is modified to include an additional two dummy symbols, and said modified codewords are interleaved into said memory.

2. The method of claim 1, wherein said modifying step comprises the step of adding one or more dummy symbols to the beginning of said codewords.

3. The method of claim 1, wherein said modifying step comprises the step of appending one or more dummy symbols to the end of said codewords.

4. A method of arranging a frame of data comprising a plurality of codewords into an interleaver memory having a length R and a depth C, wherein C is a power of 2, the method comprising the following steps:

dividing said frame into a plurality of codewords, wherein the length of said codewords is either equal or within one symbol of each other;

optionally modifying said codewords according to the following rules:
if the codewords are all of odd size, the codewords are interleaved into said memory;
if the codewords are all of even size, each said codeword is modified to include an additional symbol, and the modified even codewords are interleaved into said memory;
if the codewords are of odd and even size, and said odd size is greater than said even size, each said even codeword is modified to include an additional symbol, and said odd codewords and said modified even codewords are interleaved into said memory;

if the codewords are of odd and even size, and said even size is greater than said odd size, each said even codeword is modified to include an additional symbol, each said odd codeword is modified to include an additional two symbols, and said modified odd codewords and said modified even codewords are interleaved into said memory.

5. The method of claim 4, wherein said modifying step comprises the step of adding one or more dummy symbols to the beginning of said codewords.

6. The method of claim 4, wherein said modifying step comprises the step of appending one or more dummy symbols to the end of said codewords.

7. An interleaver circuit in which a frame of data comprising a plurality of codewords is arranged, comprising:
   a memory circuit having a length R and a depth C;
   a frame division circuit which divides said frame into a plurality of codewords, wherein the length of said codewords is either equal or within one symbol of each other;
   a codeword modification circuit which optionally modifies said codewords according to the following rules:
      if the codewords are of equal length R and (R,C)=1, then the codewords are interleaved into said memory;
      if the codewords are of equal length R, (R,C)≠1 and (R+1,C)=1, each said codeword is modified to include an additional dummy symbol, and the modified codewords are interleaved into said memory;
      if the codewords are of different size R and R+1, and (R+1,C)=1, each said codeword of length R is modified to include an additional dummy symbol, and the R+1 length codewords and the modified R length codewords are interleaved into said memory;
      if the codewords are of different size R and R+1, (R+1,C)≠1, and (R+2,C)=1, each said codeword of length R+1 is modified to include an additional dummy symbol, each said codeword of length R is modified to include an additional two dummy symbols, and said modified codewords are interleaved into said memory.

8. The interleaver circuit of claim 7, wherein said modification circuit adds one or more dummy symbols to the beginning of said codewords.

9. The interleaver circuit of claim 7, wherein said modification circuit appends one or more dummy symbols to the end of said codewords.

10. An interleaver circuit in which a frame of data comprising a plurality of codewords is arranged, comprising:
   an interleaver memory circuit having a length R and a depth C, wherein C is a power of 2:
   a frame division circuit which divides said frame into a plurality of codewords, wherein the length of said codewords is either equal or within one symbol of each other;
   a codeword modification circuit which optionally modifies said codewords according to the following rules:
      if the codewords are all of odd size, the codewords are interleaved into said memory;
      if the codewords are all of even size, each said codeword is modified to include an additional symbol, and the modified even codewords are interleaved into said memory;
      if the codewords are of odd and even size, and said odd size is greater than said even size, each said even codeword is modified to include an additional symbol, and said odd codewords and said modified even codewords are interleaved into said memory;
      if the codewords are of odd and even size, and said even size is greater than said odd size, each said even codeword is modified to include an additional symbol, each said odd codeword is modified to include an additional two symbols, and said modified odd codewords and said modified even codewords are interleaved into said memory.

11. The interleaver circuit of claim 10, wherein said modification circuit adds one or more dummy symbols to the beginning of said codewords.

12. The interleaver circuit of claim 10, wherein said modification circuit appends one or more dummy symbols to the end of said codewords.

13. A method of rearranging a frame of data comprising a plurality of codewords into a de-interleaver memory having a length R and depth C, the method comprising the following steps:
   dividing said frame into a plurality of codewords, wherein the length of said codewords is either equal or within one symbol of each other;
   optionally modifying said codewords and writing said codewords into said de-interleaver memory according to the following rules:
      if the codewords are of equal length R and (R,C)=1 then the codewords are de-interleaved into said memory by reading then writing each incoming symbol;
      if the codewords are of equal length R and (R,C)≠1 and (R+1,c)=1, then one dummy symbol is added by the de-interleave write process into the de-interleave memory at the beginning of each codeword;
      if the codewords are of different size R and R+1, and (R+1,C)=1, then at the beginning of each said codeword of length R the de-interleave write process inserts an extra dummy symbol, while performing its regular write operation for each length R+1 codeword;
      if the codewords are of different size R and R+1, and (R+1,C)≠1, and (R+2,C)=1, then at the beginning of each said codeword of length R+1 the de-interleave write process inserts an extra dummy symbol, while for each length R codeword it inserts an extra symbol at the beginning of each such codeword and at the C+1 symbol of each such codeword.

14. A method of rearranging a frame of data comprising a plurality of codewords into a de-interleaver memory having a length R and a depth C, wherein C is a power of 2, the method comprising the following steps:
   dividing said frame into a plurality of codewords, wherein the length of said codewords is either equal or within one symbol of each other;
   optionally modifying said codewords and writing said codewords into said de-interleaver memory according to the following rules:
      if the codewords are all of odd size, the codewords are deinterleaved into said memory by reading then writing each incoming symbol;
      if the codewords are all of even size, each said codeword is modified to include an additional symbol, and the modified even codewords are de-interleaved into said memory by reading then writing the modified even codewords;
      if the codewords are of odd and even size, and said odd size is greater than said even size, each said even codeword is modified to include an additional symbol, and said odd codewords and said modified even codewords are de-interleaved into said memory by reading then writing the odd codewords and modified even codewords;

if the codewords are of odd and even size, and said even size is greater than said odd size, each said even codeword is modified to include an additional symbol, each said odd codeword is modified to include an additional two symbols, and said modified odd codewords and said modified even codewords are de-interleaved into said memory by reading then writing said modified odd and even codewords.

* * * * *